United States Patent [19]

Simington

[11] 4,370,905
[45] Feb. 1, 1983

[54] CHAIN TOOTH LOCATOR

[76] Inventor: Jack F. Simington, Star Rte., Box 141, Chiloquin, Oreg. 97624

[21] Appl. No.: 168,357

[22] Filed: Jul. 15, 1980

[51] Int. Cl.³ .......................................... B23D 63/16
[52] U.S. Cl. ..................................... 76/74; 76/25 A
[58] Field of Search ................... 76/31, 37, 25 A, 74, 76/40, 41, 42, 43

[56] References Cited

U.S. PATENT DOCUMENTS

| | | | |
|---|---|---|---|
| 2,811,873 | 11/1957 | Nielsen | 76/40 |
| 2,932,994 | 4/1960 | Weatherly | 76/40 |
| 3,013,448 | 12/1961 | Deck | 76/40 |
| 3,038,355 | 6/1962 | Granberg | 76/31 |
| 3,349,645 | 10/1967 | Silvey | 76/40 |
| 3,768,341 | 10/1973 | Fitzpatrick | 76/31 |
| 3,877,324 | 4/1975 | Silvey | 76/40 |
| 4,104,793 | 8/1978 | Simington | 76/40 |

FOREIGN PATENT DOCUMENTS 2276893 1/1976 France .................... 76/40

*Primary Examiner*—Roscoe V. Parker
*Attorney, Agent, or Firm*—Harvey B. Jacobson

[57] ABSTRACT

Support structure is provided defining an elongated guide groove for slidingly receiving, guidingly engaging and supporting the guide lugs of an elongated saw chain section for selected positioning of the section along the groove. A tooth locator is provided for engaging and positioning tooth equipped links in a predetermined position along the groove to be similarly engaged and sharpened by a rotary grinding wheel mounted for movement in a predetermined path relative to the support structure. A mount is supported from the support structure and the tooth locator includes an elongated support arm having one end supported from the mount. An elongated finger is provided and pivotally mounted at one end to the other end of the arm for limited angular displacement of the finger relative to the arm about an axis at least closely adjacent and generally paralleling a plane containing the groove and paralleling the direction in which the groove opens. The finger is displaceable relative to the arm between positions slightly oppositely inclined relative to the aforementioned plane.

9 Claims, 5 Drawing Figures

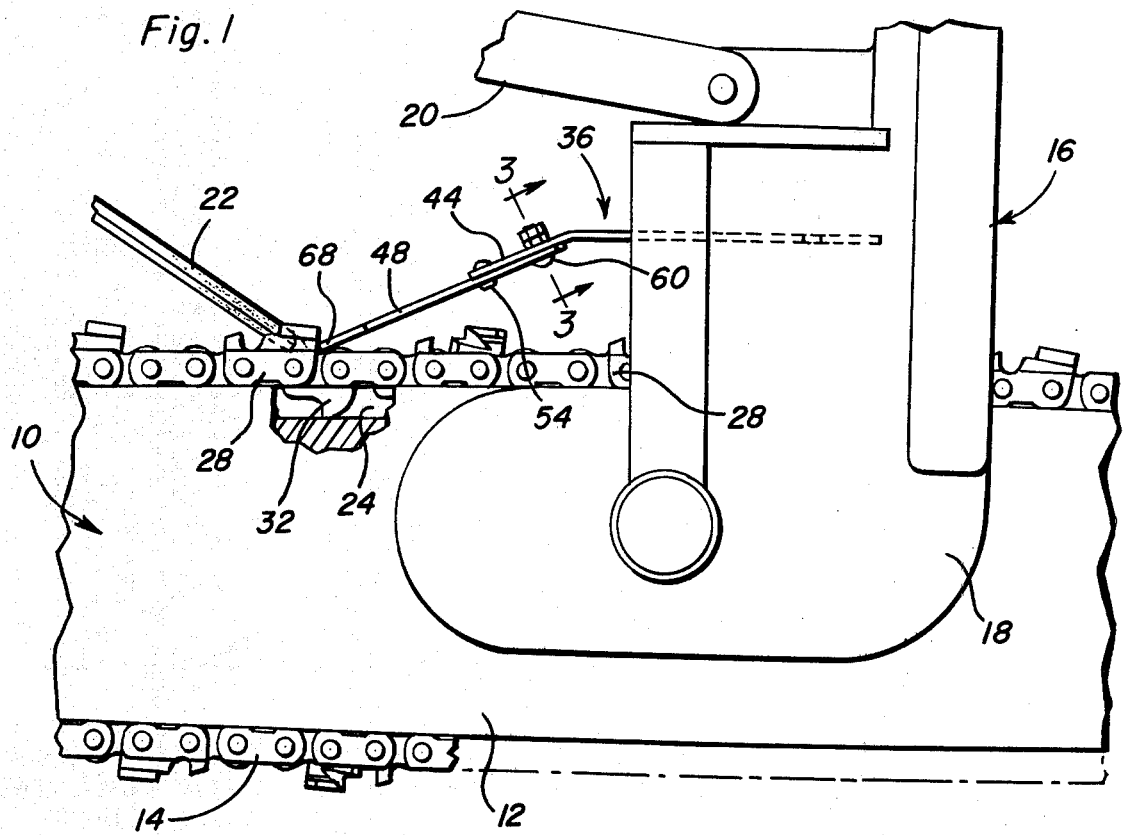
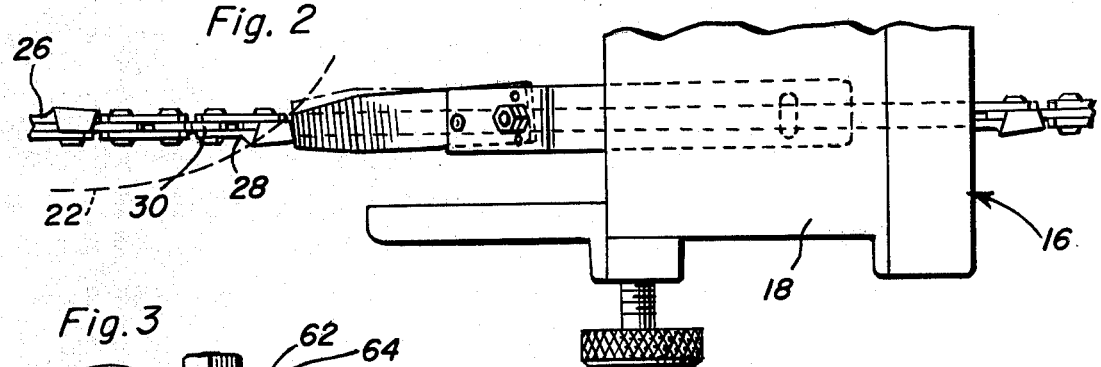
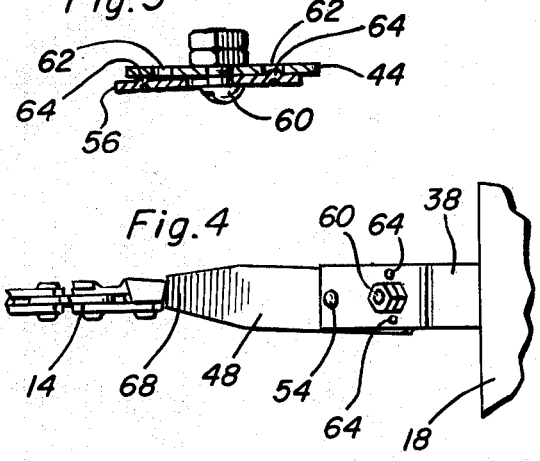
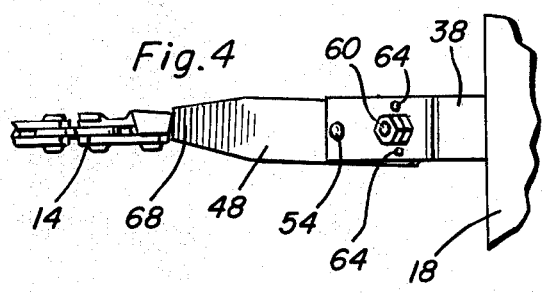
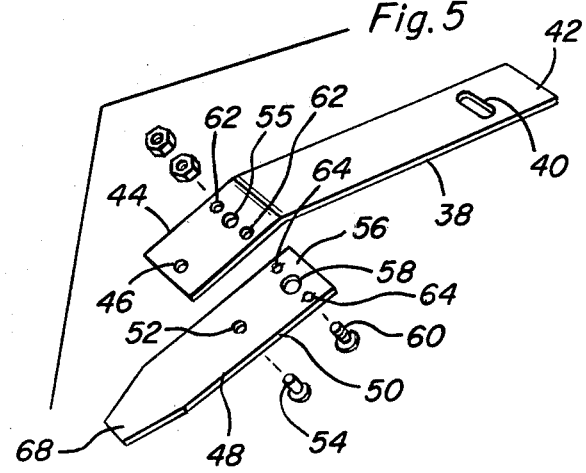

CHAIN TOOTH LOCATOR

BACKGROUND OF THE INVENTION

When a rotary grinding wheel is utilized to sharpen the teeth of a saw chain, it is important that the grinding wheel be positioned similarly relative to each tooth being sharpened thereby. In this manner, the teeth of the saw chain may be easily sharpened to effect maximum cutting efficiency and speed.

Although various forms of saw chain sharpeners utilizing rotary grinding wheels heretofore have included tooth positioning structure for properly positioning successive teeth to be sharpened for engagement by the associated rotary grinding wheel, in some instances the desired positioning of the grinding wheel relative to the tooth to be sharpened can cause interference between the rotary grinding wheel and the tooth locating structure engaged with the tooth to be sharpened. Accordingly, a need exists for a saw chain grinder tooth locator constructed in a manner whereby interference between an associated rotary grinding wheel and the tooth locator may be avoided.

Examples of known forms of tooth locators including some of the general structural and operational features of the instant invention are disclosed in U.S. Pat. Nos. 2,811,873, 3,013,448, 3,349,645, 3,877,324 and 4,104,793 as well as my co-pending U.S. application, Ser. No. 043,237, filed May 29, 1979, now U.S. Pat. No. 4,254,673, dated Mar. 10, 1981, for saw mounted saw chain sharpener.

BRIEF DESCRIPTION OF THE INVENTION

The tooth locator of the instant invention comprises a simple leaf spring-type arm having a leaf spring-type finger pivotally mounted on the free end of the arm for limited angular displacement between positions oppositely inclined relative to the longitudinal center line of the arm. The tooth locator enjoys simplicity of construction and operation and is further constructed in a manner whereby successive saw chain teeth may be moved therepast in one direction but will be prevented from moving therepast in the opposite direction.

The main object of this invention is to provide an effective tooth locator for use in conjunction with a rotary grinding wheel equipped saw chain sharpener.

Another object of this invention is to provide a tooth locator whose construction will enable it to be utilized in conjunction with various different types of saw chain sharpeners.

Still another object of this invention is to provide a tooth locator which may be utilized effectively on saw chains having cutting teeth of different types.

Still another object of this invention is to provide a tooth locator which may be utilized effectively in conjunction with a rotary grinding wheel for sharpening opposite side teeth of an associated chain and with the tooth locator being shiftable laterally in opposite directions relative to the longitudinal center line of the associated chain in order that the tooth locator may be maintained out of position in which interference between the tooth locator and the associated rotary grinding wheel may occur.

A final object of this invention to be specifically enumerated herein is to provide a saw chain sharpener tooth locator which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a chain saw having the mount portion of a chain saw bar mounted sharpener operatively associated therewith and with the chain tooth locator of the instant invention operatively associated with the sharpener mount;

FIG. 2 is a top plan view of the assemblage illustrated in FIG. 1 with a centered position of the locator illustrated in phantom lines;

FIG. 3 is an enlarged fragmentary vertical sectional view taken substantially upon the plane indicated by the section line 3—3 of FIG. 1;

FIG. 4 is a fragmentary top plan view similar to FIG. 2 but with the oscillatable finger portion of the tooth locator in an opposite angularly displaced position relative to the position thereof illustrated in FIG. 2; and FIG. 5 is an exploded perspective view of the tooth locator.

DETAILED DESCRIPTION OF THE INVENTION

Referring now more specifically to the drawings, the numeral 10 generally designates a conventional form of chain saw including a bar 12 around which a saw chain 14 is trained.

A saw chain sharpener is fragmentarily illustrated in FIG. 1 and is referred to in general by the reference numeral 16. The sharpener 16 includes a mount 18 removably stationarily supported from the bar 12 and including linkage structure 20 supporting a rotary grinding head 22 for predetermined guided movement relative to the mount 18. The sharpener 16 may be considered as generally similar to the sharpener disclosed in my above noted co-pending application, Ser. No. 043,237, now U.S. Pat. No. 4,254,673, dated Mar. 10, 1981.

The bar 12 is of conventional construction including a groove 24 extending marginally thereabout. The chain 14 includes tooth equipped opposite side links 26 and 28 as is conventional and center links 30 equipped with guide lugs 32.

The guide lugs 32 are slidingly received in the groove 24 and the tooth locator of the instant invention is referred to in general by the reference numeral 36 and is utilized to engage and properly position each cutting tooth equipped side link to be sharpened.

From FIGS. 1, 2 and 5 of the drawings, it may be seen that the tooth locator 36 includes an elongated arm 38 having a transversely extending slot 40 formed in one end 42. The end 42 is stationarily mounted on the mount 18 through the utilization of a fastener (not shown) secured through the slot 40 and anchored relative to the mount 18.

The arm 38 generally parallels the bar 12 and the opposite end 44 of the arm 38 is slightly downwardly angulated and provided with a pivot bore 46. An elongated finger 48 is provided and one end portion 50 of the finger includes a pivot bore 52 formed therein registrable with the bore 46. A pivot fastener 54 is secured through the bores 46 and 52 and thus pivotally attaches the finger 48 to the end 44 of the arm 38.

The arm 38 includes a second bore 55 formed in the end 44 thereof and the terminal end 56 of the finger 48 includes a transverse slot 58. A fastener 60 is passed through the slot 58 and secured through the bore 55, the fastener 60 being engageable with the opposite ends of the slot 58 to define limits of oscillation of the finger 48 relative to the end 44 of the arm 38.

The end 44 includes detent bores 62 formed therein on opposite sides of the bore 54 and the terminal end 56 includes detents 64 receivable in the detent bores 62. The spacing between the detents 64 is greater than the spacing between the detent bores 62 and when the fastener 60 is seated in the right-hand end of the slot 58 illustrated in FIG. 5, the left-hand detent 64 is seated in the left-hand detent bore 62. On the other hand, when the fastener 60 is seated in the left-hand end of the slot 58 illustrated in FIG. 5, the right-hand detent 64 is seated in the right-hand detent bore 62.

The arm 38 and finger 48 are each constructed of flat spring stock material. Thus, the inherent resiliency of the arm 38 and finger 48 tend to cause the oppositely bevelled terminal end 68 of the finger 48 to be downwardly biased into engagement with the upper surfaces of the links 26, 28 and 30 for engagement with the tooth portions on the links 26 and 28.

In operation, the chain 14 may have the upper reach thereof illustrated in FIG. 1 advanced to the left relative to the tooth locator 36. As each tooth portion is advanced to the left and engages the finger 48, the latter is upwardly biased away from the bar 12 to allow the tooth equipped link to pass beneath the terminal end 68 of the finger 48. However, as soon as the desired tooth equipped link as passed beneath the terminal end 68 of the finger, the upper reach of the chain 14 is then shifted to the right in order to abut that tooth equipped link against the terminal end 68 of the finger 48. This, of course, will cause the tooth equipped link abutted against the finger 48 to be properly positioned for sharpening, by grinding, as a result of engagement of the rotary grinding head 22 with the tooth to be sharpened.

With attention invited now to FIGS. 2 and 4 of the drawings, when the tooth equipped side links 28 are to be sharpened, the terminal end 68 of the finger 48 is shifted to its limit position corresponding to that side of the chain 14. However, when the tooth equipped links 26 are to be sharpened, the terminal end of the finger 48 is swung to that side of the chain 14.

As an alternative to the spring arm 38, the support arm could be rigid, pivotally supported from the mount and spring biased to swing the free end thereof toward the bar 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a support structure defining an elongated guide groove for slidingly receiving, guidingly engaging and supporting the guide lugs of an elongated saw chain section for selective positioning of the chain section along the groove, a tooth locator for engaging successive tooth equipped links of the chain section and positioning the links in predetermined position along the groove to be similarly engaged and sharpened by a rotary grinding wheel mounted for guided movement in a predetermined path relative to said support structure, said tooth locator including a mount supported from said support structure, said tooth locator including an elongated support arm having one end supported from said mount, an elongated finger, mounting means pivotally mounting one end of said finger from the other end of said arm for limited angular displacement of said finer relative to said arm about an axis at least closely adjacent and generally paralleling a plane containing said groove and paralleling the direction in which said groove opens, said finger being displaceable relative to said arm between positions slightly oppositely inclined relative to said plane, said arm and said finger including coacting detent means operative to releasably retain said finger in each of said oppositely inclined positions.

2. The combination of claim 1 wherein said arm comprises a leaf spring member.

3. The combination of claim 2 wherein said finger also comprises a leaf spring member.

4. The combination of claim 1 wherein the other end of said finger tapers, laterally, toward its free end portion.

5. In combination with a support structure defining an elongated guide groove for slidingly receiving, guidingly engaging and supporting the guide lugs of an elongated saw chain section for selective positioning of the chain section along the groove, a tooth locator for engaging successive tooth equipped links of the chain section and positioning the links in predetermined position along the groove to be similarly engaged and sharpened by a rotary grinding wheel mounted for guided movement in a predetermined path relative to said support structure, said tooth locator including a mount supported from said support structure, said tooth locator including an elongated support arm having one end supported from said mount, an elongated finger, mounting means pivotally mounting one end of said finger from the other end of said arm for limited angular displacement of said finger relative to said arm about an axis at least closely adjacent and generally paralleling a plane containing said groove and paralleling the direction in which said groove opens, said finger being displaceable relative to said arm between positions slightly oppositely inclined relative to said plane, the other end of said arm including a fixed abutment supported therefrom, said finger including a transverse slot in which said abutment is slidably received and in whose opposite ends said abutment is abuttingly seatable defining limits of oscillation of said finger relative to said arm.

6. The combination of claim 5 wherein said arm and finger include coacting detent structure operative to releasably retain said finger in its limit positions of oscillation.

7. The combination of claim 6 wherein said arm comprises a leaf spring member.

8. The combination of claim 7 wherein said finger also comprises a leaf spring member.

9. The combination of claim 8 wherein the other end of said finger tapers, laterally, toward its free end portion.

* * * * *